(12) United States Patent
Yin et al.

(10) Patent No.: US 12,176,655 B2
(45) Date of Patent: Dec. 24, 2024

(54) POWER DISTRIBUTION COMPONENT AND POWER DISTRIBUTION DEVICE

(71) Applicant: Huawei Digital Power Technologies Co., Ltd., Shenzhen (CN)

(72) Inventors: Kai Yin, Dongguan (CN); Cheng Ma, Dongguan (CN); Xiaoke Ran, Dongguan (CN); Wei Guo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 332 days.

(21) Appl. No.: 17/683,767

(22) Filed: Mar. 1, 2022

(65) Prior Publication Data

US 2022/0285885 A1  Sep. 8, 2022

(30) Foreign Application Priority Data

Mar. 3, 2021 (CN) .......................... 202120468069.2

(51) Int. Cl.
| | |
|---|---|
| *H01R 13/642* | (2006.01) |
| *H02B 1/056* | (2006.01) |
| *H02B 1/20* | (2006.01) |
| *H02H 3/08* | (2006.01) |

(52) U.S. Cl.
CPC .......... *H01R 13/642* (2013.01); *H02B 1/056* (2013.01); *H02B 1/20* (2013.01); *H02H 3/08* (2013.01)

(58) Field of Classification Search
CPC ........ H01R 13/642; H02B 1/056; H02B 1/20; H02H 3/08

USPC ......................................................... 439/374
See application file for complete search history.

(56) References Cited

U.S. PATENT DOCUMENTS

| | | | | |
|---|---|---|---|---|
| 3,634,816 A | * | 1/1972 | Zell ...................... | H01R 12/737 |
| | | | | 439/633 |
| 6,771,514 B1 | * | 8/2004 | Elg ....................... | H05K 7/1452 |
| | | | | 439/633 |
| 8,608,493 B2 | * | 12/2013 | Cowles ................ | H05K 7/1455 |
| | | | | 439/138 |

(Continued)

FOREIGN PATENT DOCUMENTS

| | | | |
|---|---|---|---|
| CN | 204167667 U | * | 2/2015 |
| CN | 204332851 U | * | 5/2015 |

(Continued)

*Primary Examiner* — Peter G Leigh
(74) *Attorney, Agent, or Firm* — Rimon PC

(57) ABSTRACT

The power distribution component is configured to connect to a power distribution box in a pluggable manner. A main body is provided with a first power terminal, a signal terminal, and a second power terminal that are arranged along a first direction. The first power terminal is configured to electrically connect to a first power busbar of the power distribution box, the signal terminal is configured to electrically connect to a signal busbar of the power distribution box, and the second power terminal is configured to electrically connect to a second power busbar of the power distribution box. Polarities of the first power terminal and the second power terminal are opposite. An end, facing away from the main body, of the mistake proofing structure is provided with an abutting surface, configured to abut against the signal busbar when the power distribution component is reversely inserted into the power distribution box.

18 Claims, 7 Drawing Sheets

(56) References Cited

U.S. PATENT DOCUMENTS

| | | | | |
|---|---|---|---|---|
| 9,360,899 B2* | 6/2016 | Morgan | ............... | G02B 6/4284 |
| 2019/0115180 A1* | 4/2019 | Brasme | .................... | H01H 1/44 |

FOREIGN PATENT DOCUMENTS

| | | | | | |
|---|---|---|---|---|---|
| CN | 204407263 U | * | 6/2015 | | |
| CN | 204407264 U | * | 6/2015 | | |
| CN | 205016477 U | * | 2/2016 | | |
| CN | 105810511 A | * | 7/2016 | | |
| CN | 105810513 A | | 7/2016 | | |
| CN | 106340427 A | * | 1/2017 | ......... | H01H 71/0214 |
| CN | 106340428 A | * | 1/2017 | ......... | H01H 71/0214 |
| CN | 209448232 U | * | 9/2019 | ............... | H02B 1/04 |
| CN | 111710566 A | * | 9/2020 | | |

* cited by examiner

POWER DISTRIBUTION COMPONENT AND POWER DISTRIBUTION DEVICE

CROSS-REFERENCE TO RELATED APPLICATION

This application claims priority to Chinese Patent Application No. 202120468069.2, filed on Mar. 3, 2021, which is hereby incorporated by reference in its entirety.

TECHNICAL FIELD

This application relates to the field of power distribution technologies, and in particular, to a power distribution component and a power distribution device.

BACKGROUND

With the rapid development of networks and big data, power distribution cabinets required for communication base stations and data centers are increasingly complex. A power distribution system in a power distribution cabinet is used to supply working power to a base station or server. For example, direct current power distribution of a −48 V power system in the communication base station is usually based on a −48 V busbar, and a circuit breaker is used as an output protection device.

The circuit breaker is a switch apparatus capable of closing, bearing, and breaking a current under a normal circuit condition and capable of closing, bearing, and breaking a current under an abnormal circuit condition within a specified time. There is an existing plug-in circuit breaker, which can be connected to a power distribution box in a pluggable manner, to meet requirements of high density, easy installation, and easy maintenance in the communication industry, especially in scenarios such as an installation in a narrow space, and a scenario with a wire guide direction perpendicular to a cabinet panel direction.

When the plug-in circuit breaker is inserted into the power distribution box, it is easy occurrence of to insert the circuit breaker backwards, a situation of reverse insertion. Reverse insertion may lead to reverse connection of positive and negative electrodes, which may cause a risk of short-circuit overheating. In order to resolve problem of reverse insertion, a guide trough is usually disposed on a side surface of the plug-in circuit breaker, and a limiting plate matching the guide trough is disposed on the power distribution box. In scenarios with different widths of plug-in circuit breakers, however, the limiting plate limits flexibility of onsite configuration of the plug-in circuit breaker.

SUMMARY

Embodiments of this application provide a power distribution component and a power distribution device that can improve configuration flexibility while preventing reverse insertion.

According to a first aspect, this application provides a power distribution component, configured to connect to a power distribution box in a pluggable manner. The power distribution component includes at least one power distribution unit, and the power distribution unit includes a main body. The main body includes a first end and a second end that are disposed opposite to each other. The second end is provided with a first power terminal, a signal terminal, and a second power terminal that are sequentially arranged along a first direction. The first power terminal is configured to electrically connect to a first power busbar of the power distribution box. The signal terminal is configured to electrically connect to a signal busbar of the power distribution box. The second power terminal is configured to electrically connect to a second power busbar of the power distribution box. Polarities of the first power terminal and the second power terminal are opposite. The power distribution unit further includes a mistake proofing structure protruding at the second end. An end, facing away from the main body, of the mistake proofing structure is provided with an abutting surface. The abutting surface is configured to abut against the signal busbar when the power distribution component is reversely inserted into the power distribution box.

In the power distribution component provided in the first aspect of this application, the mistake proofing structure protrudes at the second end of the main body. An end, facing away from the main body, of the mistake proofing structure is provided with the abutting surface. The abutting surface is configured to abut against the signal busbar when the power distribution component is reversely inserted into the power distribution box, to prevent the first power terminal from coming into contact with the second power busbar, and/or preventing the second power terminal from coming into contact with the first power busbar. In other words, the mistake proofing structure can prevent a problem of reverse connection of positive and negative electrodes caused when the power distribution component is reversely inserted into the power distribution box. Therefore, a risk of short-circuit overheating caused by reverse insertion of the power distribution component into the power distribution box is reduced, thereby improving safety and reliability of the power distribution component and the power distribution device.

In addition, because the mistake proofing structure is used for anti-reverse insertion, arrangement of a guide trough on an outer side surface of the main body can be omitted, and arrangement of a limiting plate matching the guide trough can be omitted on the power distribution box. This can simplify structures of the power distribution component and the power distribution box, and improve flexibility of onsite configuration of the power distribution component.

According to the first aspect, in a first implementation of the first aspect of this application, an end surface of the second end of the main body is provided with a first power insertion slot, a signal insertion slot, and a second power insertion slot that are sequentially arranged along the first direction. The first power terminal is disposed on an inner side surface of the first power insertion slot, the signal terminal is disposed on an inner side surface of the signal insertion slot, and the second power terminal is disposed on an inner side surface of the second power insertion slot. The first power insertion slot is configured to connect to the first power busbar through insertion, the signal insertion slot is configured to connect to the signal busbar through insertion, and the second power insertion slot is configured to connect to the second power busbar through insertion. The mistake proofing structure is disposed between the first power insertion slot and the signal insertion slot, and/or the mistake proofing structure is disposed between the signal insertion slot and the second power insertion slot.

During insertion of the power distribution component into the power distribution box, the first power insertion slot can guide movement of the first power busbar relative to the power distribution component. In addition, when the first power busbar is in contact with the first power terminal, the inner side surface of the first power insertion slot can limit and protect the first power busbar, thereby improving the stability of the contact between the first power busbar and the first power terminal.

During insertion of the power distribution component into the power distribution box, the signal insertion slot can guide the movement of the signal busbar relative to the power distribution component. In addition, when the signal busbar is in contact with the signal terminal, the inner side surface of the signal insertion slot can limit the signal busbar, thereby improving stability of contact between the signal busbar and the signal terminal.

During insertion of the power distribution component into the power distribution box, the second power insertion slot can guide the movement of the second power busbar relative to the power distribution component. In addition, when the second power busbar is in contact with the second power terminal, the inner side surface of the second power insertion slot can limit and protect the second power busbar, thereby improving stability of contact between the second power busbar and the second power terminal.

According to the first aspect or the first implementation of the first aspect of this application, in a second implementation of the first aspect of this application, the main body further includes a body top surface and a body bottom surface that are disposed in parallel and opposite to each other. The power distribution component has a central plane, and a vertical distance between the central plane and the body top surface is the same as a vertical distance between the central plane and the body bottom surface. A position of the first power insertion slot and a position of the second power insertion slot are disposed symmetric about the central plane. The abutting surface includes an effective abutting surface, and the effective abutting surface is configured to come into contact with the signal busbar when the power distribution component is reversely inserted into the power distribution box. A distance between the effective abutting surface and the central plane is a first distance, a distance between an inner side surface, close to the mistake proofing structure, of the signal insertion slot and the central plane is a second distance, and the first distance is the same as the second distance. The mistake proofing structure is provided with an effective abutting surface along the first direction, to effectively abut against the signal busbar when the power distribution component is reversely inserted into the power distribution box, to prevent the first power terminal from coming into contact with the second power busbar, and/or prevent the second power terminal from coming into contact with the first power busbar.

According to the first aspect or the first and second implementations of the first aspect of this application, in a third implementation of the first aspect of this application, an extension length of the first power insertion slot along a second direction is a first length, an extension length of the signal insertion slot along the second direction is a second length, and an extension length of the mistake proofing structure along the second direction is a third length. The third length is not less than a difference between the first length and the second length, and the second direction is perpendicular to the first direction. In this way, a length of the mistake proofing structure in the second direction is large enough, so that when the power distribution component is reversely inserted into the power distribution box, the first power busbar can be effectively prevented from being inserted into the second power insertion slot and/or the second power busbar can be effectively prevented from being inserted into the first power insertion slot, thereby further improving safety and reliability of the power distribution component.

According to the first aspect or the first to third implementations of the first aspect of this application, in a fourth implementation of the first aspect of this application, the mistake proofing structure further includes a first surface and a second surface, the abutting surface is connected between the first surface and the second surface, the first surface is provided on a side, close to the signal insertion slot, of the mistake proofing structure, and the second surface is provided on a side, facing away from the signal insertion slot, of the mistake proofing structure.

According to the first aspect or the first to fourth implementations of the first aspect of this application, in a fifth implementation of the first aspect of this application, the first surface and an inner side surface, close to a side of the mistake proofing structure, of the signal insertion slot are located on a same plane. The first surface is configured to attach to the signal busbar when the signal busbar is inserted into the signal insertion slot, so that stability of contact between the signal terminal and the signal busbar can be improved. The first surface can further guide the signal busbar during insertion into the signal insertion slot, thereby improving smoothness of movement of the signal busbar relative to the mistake proofing structure.

According to the first aspect or the first to fifth implementations of the first aspect of this application, in a sixth implementation of the first aspect of this application, the mistake proofing structure disposed between the first power insertion slot and the signal insertion slot is a first mistake proofing structure. A second surface of the first mistake proofing structure and an inner side surface, close to a side of the signal insertion slot, of the first power insertion slot are located on a same plane. The second surface of the first mistake proofing structure is configured to attach to the first power busbar when the first power busbar is inserted into the first power insertion slot, so that stability of contact between the first power terminal and the first power busbar can be improved. The second surface of the first mistake proofing structure can further guide insertion of the first power busbar into the first power insertion slot, thereby improving smoothness of movement of the first power insertion slot relative to the mistake proofing structure.

According to the first aspect or the first to sixth implementations of the first aspect of this application, in a seventh implementation of the first aspect of this application, the mistake proofing structure disposed between the second power insertion slot and the signal insertion slot is a second mistake proofing structure. A second surface of the second mistake proofing structure and an inner side surface, close to the signal insertion slot, of the second power insertion slot are located on a same plane. The second surface of the second mistake proofing structure is configured to attach to the second power busbar when the second power busbar is inserted into the second power insertion slot, so that stability of contact between the second power terminal and the second power busbar can be improved. The second surface of the second mistake proofing structure can further guide insertion of the first power busbar into the first power insertion slot, thereby improving smoothness of movement of the first power insertion slot relative to the mistake proofing structure.

According to the first aspect or the first to seventh implementations of the first aspect of this application, in an eighth implementation of the first aspect of this application, the main body further includes a body top surface, a body bottom surface, and a body side surface. The body top surface and the body bottom surface are disposed opposite to each other. The body side surface is connected between the body top surface and the body bottom surface. The main body extends in a second direction different from the first direction. The mistake proofing structure further includes an outer side surface connecting the first surface and the second surface. The outer side surface is disposed toward the outside of the power distribution unit, and the outer side surface and the body side surface are located on a same plane, so that the outer side surface of the power distribution unit is kept flat, to facilitate insertion of the power distribution component into the power distribution box.

According to the first aspect or the first to eighth implementations of the first aspect of this application, in a ninth implementation of the first aspect of this application, each mistake proofing structure includes at least two mistake proofing plates, the at least two mistake proofing plates are disposed on an end surface of the second end of the main body at an interval, and the abutting surface is located on a surface, facing away from the main body, of the mistake proofing plate. The mistake proofing structure includes the at least two mistake proofing plates disposed at an interval, which helps reduce manufacturing material and reduce costs.

According to the first aspect or the first to ninth implementations of the first aspect of this application, in a tenth implementation of the first aspect of this application, the main body extends in a second direction different from the first direction, at least two mistake proofing plates are arranged on an end surface of the second end of the main body along a third direction at an interval, the third direction is different from the first direction, and the third direction is different from the second direction.

According to a second aspect, this application further provides a power distribution device, including the power distribution component according to the first aspect or the first to tenth implementations of the first aspect and a power distribution box. The power distribution box includes a box body, a first power busbar, a second power busbar, and a signal busbar. The first power busbar, the signal busbar, and the second power busbar are sequentially arranged in the box body along a first direction. The power distribution component is connected to the box body in a pluggable manner. The first power busbar is electrically connected to the first power terminal, the second power busbar is electrically connected to the second power busbar, and the signal busbar is electrically connected to the signal terminal.

DESCRIPTION OF EMBODIMENTS

To make objectives, technical solutions, and advantages of this application more clear, the following further describes this application in detail with reference to the accompanying drawings.

During insertion of a plug-in power distribution component into a power distribution box, reverse insertion is likely to occur. A posture of the power distribution component inserted into the power distribution box is equivalent to a posture obtained by rotating a posture of the power distribution component correctly inserted into the power distribution box by 180 degrees around an axial direction of the power distribution component. Reverse insertion easily leads to reverse connection of positive and negative electrodes, posing a risk of short-circuit overheating. In order to resolve the problem of reverse insertion, a guide trough is usually disposed on a side surface of a plug-in circuit breaker, and a limiting plate matching the guide trough is disposed in the power distribution box. In scenarios with different widths of plug-in circuit breakers, however, the limiting plate limits flexibility of onsite configuration of the plug-in circuit breaker.

Based on this, this application provides a power distribution component and a related power distribution device. The power distribution component is configured to connect to a power distribution box in a pluggable manner. The power distribution component includes a main body, and the main body includes a first end and a second end that are disposed opposite to each other. The second end is provided with a first power terminal, a signal terminal, and a second power terminal that are sequentially arranged along a first direction. The first power terminal is configured to electrically connect to a first power busbar of the power distribution box. The signal terminal is configured to electrically connect to a signal busbar of the power distribution box. The second power terminal is configured to electrically connect to a second power busbar of the power distribution box. Polarities of the first power terminal and the second power terminal are opposite. A power distribution unit further includes a mistake proofing structure protruding at the second end. An end, facing away from the main body, of the mistake proofing structure is provided with an abutting surface. The abutting surface is configured to abut against the signal busbar when the power distribution component is reversely inserted into the power distribution box.

The following is described based on specific embodiments.

Figure 1:
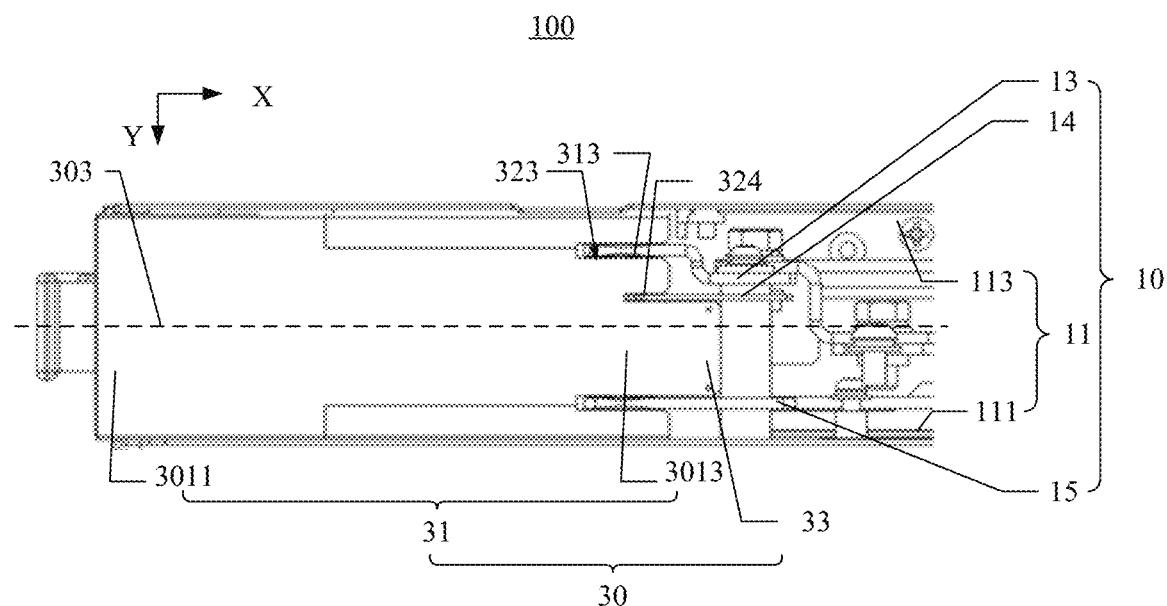
FIG. 1 is a side view of a power distribution device according to a first embodiment of this application.

Refer to FIG. 1. A first embodiment of this application provides a power distribution device 100. The power distribution device 100 includes a power distribution box 10 and a power distribution component 30. The power distribution component 30 may be plugged into the power distribution box 10.

The power distribution box 10 includes a box body 11, a first power busbar 13, a signal busbar 14, and a second power busbar 15. The box body 11 includes a bottom wall 111 and a top wall 113 that are disposed opposite to each other. The first power busbar 13, the signal busbar 14, and the second power busbar 15 are sequentially arranged in the box body 11 along a first direction (as shown by a Y direction in FIG. 1). The box body 11 extends in a second direction (as shown by an X direction in FIG. 1) different from the first direction. In this embodiment, the second power busbar 15 is disposed close to the bottom wall 111 of the box body 11, and the first power busbar 13 is disposed close to the top wall 113.

The power distribution component 30 may be a front wiring pluggable electrical connector or a front wiring pluggable circuit breaker. It can be understood that the power distribution component 30 may be a front wiring pluggable fuse or another type of power distribution component. The power distribution component 30 is roughly bar-shaped, an axial direction of the power distribution component 30 is parallel to the second direction, and the second direction is perpendicular to the first direction.

Figure 2:
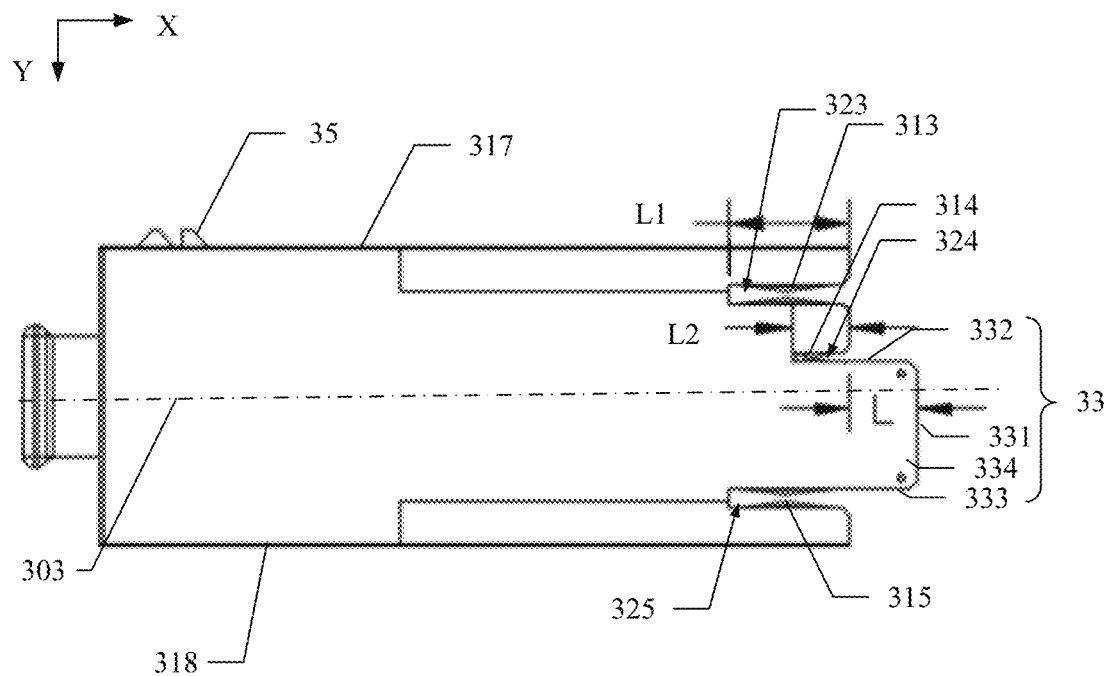
FIG. 2 is a side view of a power distribution component according to a first embodiment of this application.
Figure 3:
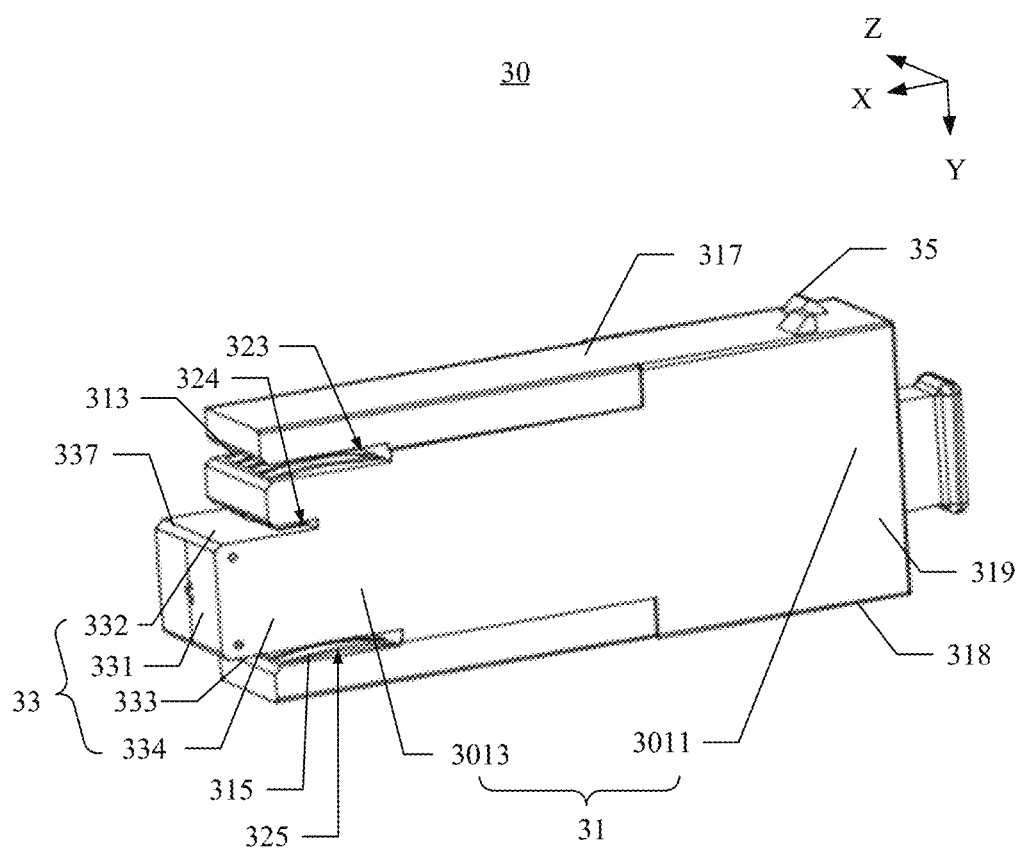
FIG. 3 is a schematic three-dimensional diagram of the power distribution component shown in FIG. 2.

Refer to FIG. 2 and FIG. 3. The power distribution component 30 includes a main body 31 and a mistake proofing structure 33. The main body 31 includes a first end 3011 and a second end 3013 that are disposed opposite to each other. The first end 3011 is a front end of the power distribution component 30 facing a user, and the second end 3013 is a back end of the power distribution component 30 facing away from a user.

The second end 3013 is provided with a first power terminal 313, a signal terminal 314, and a second power terminal 315 that are sequentially arranged along the first direction. The first power terminal 313 is configured to electrically connect to the first power busbar 13 of the power distribution box 10, the signal terminal 314 is configured to electrically connect to the signal busbar 14 of the power distribution box 10, and the second power terminal 315 is configured to electrically connect to the second power busbar 15 of the power distribution box 10. Polarities of the first power terminal 313 and the second power terminal 315 are opposite, for example, the first power terminal 313 is a positive electrode, and the second power terminal 315 is a negative electrode.

The mistake proofing structure 33 protrudes at the second end 3013 of the main body 31. An end, facing away from the main body 31, of the mistake proofing structure 33 is provided with an abutting surface 331. The abutting surface 331 is configured to abut against the signal busbar 14 when the power distribution component 30 is reversely inserted into the power distribution box 10, to prevent the first power terminal 313 from coming into contact with the second power busbar 15, and/or prevent the second power terminal 315 from coming into contact with the first power busbar 13. Therefore, the risk of short-circuit overheating caused by reverse insertion of the power distribution component 30 into the power distribution box 10 is reduced, thereby improving safety and reliability of the power distribution component 30 and the power distribution device 100.

In addition, because the mistake proofing structure 33 is used for anti-reverse insertion, arrangement of a guide trough on an outer side surface of the main body 31 can be omitted, and a limiting plate matching the guide trough does not need to be disposed to protrude from the bottom wall 111 of the box body 11. This can simplify structures of the power distribution component 30 and the power distribution box 10, and improve flexibility of onsite configuration of the power distribution component 30.

More specifically, an end surface of the second end 3013 of the main body 31 is provided with a first power insertion slot 323, a signal insertion slot 324, and a second power insertion slot 325 that are sequentially arranged along the first direction. The main body 31 extends in the second direction.

The first power insertion slot 323 is configured to connect to the first power busbar 13 through insertion. The first power terminal 313 is disposed on an inner side surface of the first power insertion slot 323. During insertion of the power distribution component 30 into the power distribution box 10, the first power insertion slot 323 can guide movement of the first power busbar 13 relative to the power distribution component 30. In addition, when the first power busbar 13 is in contact with the first power terminal 313, the inner side surface of the first power insertion slot 323 can limit and protect the first power busbar 13, thereby improving stability of contact between the first power busbar 13 and the first power terminal 313.

The signal insertion slot 324 is configured to connect to the signal busbar 14 through insertion. The signal terminal 314 is disposed on an inner side surface of the signal insertion slot 324. During insertion of the power distribution component 30 into the power distribution box 10, the signal insertion slot 324 can guide movement of the signal busbar 14 relative to the power distribution component 30. In addition, when the signal busbar 14 is in contact with the signal terminal 314, the inner side surface of the signal insertion slot 324 can limit the signal busbar 14, thereby improving stability of contact between the signal busbar 14 and the signal terminal 313.

The second power insertion slot 325 is configured to connect to the second power busbar 15 through insertion. The second power terminal 315 is disposed on an inner side surface of the second power insertion slot 325. During insertion of the power distribution component 30 into the power distribution box 10, the second power insertion slot 325 can guide movement of the second power busbar 15 relative to the power distribution component 30. In addition, when the second power busbar 15 is in contact with the second power terminal 315, the inner side surface of the second power insertion slot 325 can limit and protect the second power busbar 15, thereby improving stability of contact between the second power busbar 15 and the second power terminal 315.

An extension length of the first power insertion slot 323 along the second direction is a first length L1. An extension length of the signal insertion slot 324 along the second direction is a second length L2. An extension length of the mistake proofing structure 33 along the second direction is a third length L. The third length L is not less than a difference between the first length L1 and the second length L2, that is, $L > L1 - L2$. A length of the mistake proofing structure 33 is large enough, so that when the power distribution component 30 is reversely inserted into the power distribution box 10, the first power busbar 13 can be prevented from sliding into the second power insertion slot 325 and the second power busbar 15 can be prevented from sliding into the first power insertion slot 323, thereby further improving reliability of the power distribution component 30.

In this embodiment, the power distribution component 30 has a central plane 303, and the central plane 303 is perpendicular to the first direction. The central plane 303 is located at a position of one half of a length of the power distribution component 30 extending in the first direction. A position of the first power insertion slot 323 and a position of the second power insertion slot 325 are disposed symmetric about the central plane 303. The main body 31 further includes a body top surface 317, a body bottom surface 318, and a body side surface 319. The body side surface 319 is connected between the body top surface 317 and the body bottom surface 318. The body top surface 317 is configured to slidably connect to the top wall 113 of the box body 10. The body bottom surface 318 is configured to slidably connect to the bottom wall 111 of the box body 10. In this embodiment, the body top surface 317 and the body bottom surface 318 are roughly planes perpendicular to the first direction. To be specific, a vertical distance between the body top surface 317 and the central plane 303 is the same as a vertical distance between the body bottom surface 318 and the central plane 303.

In this embodiment, each power distribution component 30 has one mistake proofing structure 33, and the mistake proofing structure 33 is located between the signal insertion slot 324 and the second power insertion slot 325.

Figure 4:
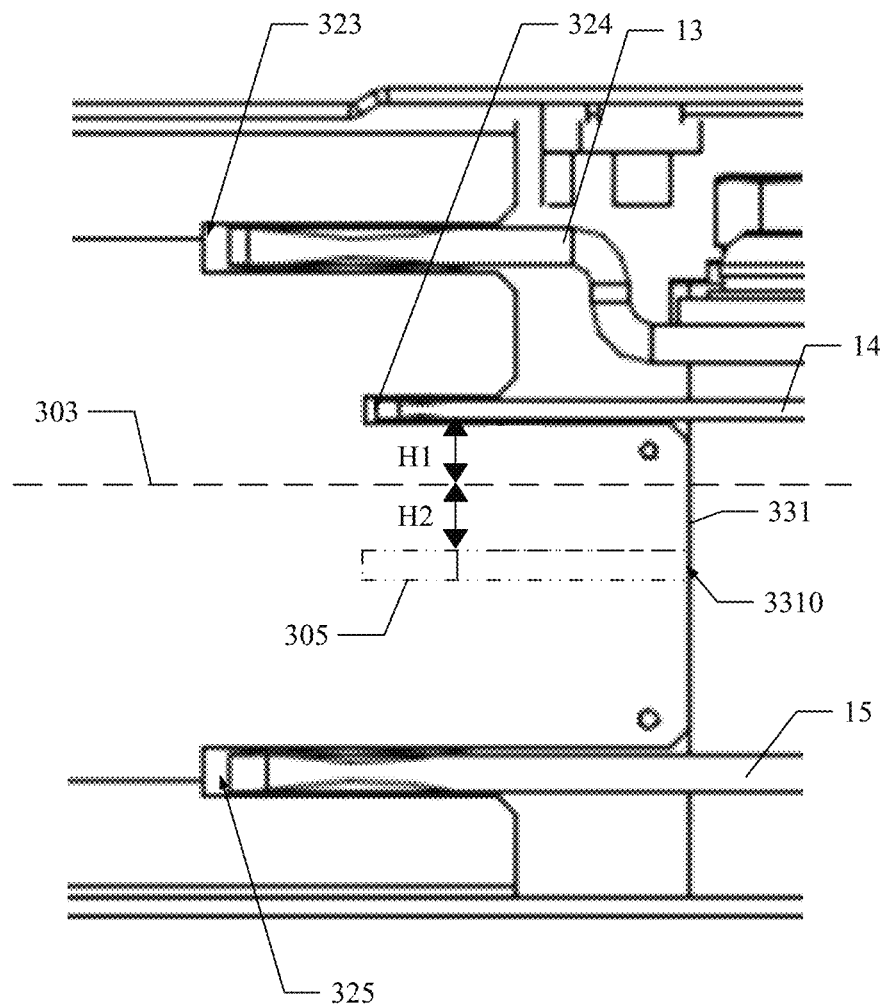
FIG. 4 is a schematic diagram of a partially enlarged area in FIG. 1.

The mistake proofing structure 33 is roughly cuboid-shaped. The mistake proofing structure 33 and the main body 31 may be integrally disposed or separately disposed. Refer to FIG. 4. The abutting surface 331 includes an effective abutting surface 3310, and the effective abutting surface 3310 is configured to come into contact with the signal busbar 14 when the power distribution component 30 is reversely inserted into the power distribution box 10. A distance between the effective abutting surface 3310 and the central plane 310 is a first distance H1, and a distance between an inner side surface, close to the mistake proofing structure 33, of the signal insertion slot 324 and the central plane 303 is a second distance H2. The first distance H1 is the same as the second distance H2. When the power distribution component 30 is reversely inserted into the power distribution box 10, the effective abutting surface 3310 is an area in which the signal busbar 14 is effectively in contact with the abutting surface 331. A broken-line area 305 and the signal insertion slot 314 are symmetric about the central plane 303. The effective abutting surface 3310 corresponds to the broken-line area 305.

It can be understood that a shape and a structure of the abutting surface 331 are not limited in this application, as long as the abutting surface 331 is provided with an effective abutting surface 3310 that can effectively come into contact with the signal busbar 14 when the power distribution component 30 is reversely inserted into the power distribution box 10.

The mistake proofing structure 33 further includes a first surface 332, a second surface 333, and an outer side surface 334. The first surface 332 is located on a side, close to the signal insertion slot 324, of the mistake proofing structure 33, and the second surface 333 is located on a side, close to the second power insertion slot 325, of the mistake proofing structure 33. The abutting surface 331 is located between the first surface 332 and the second surface 333. The outer side surface 334 is disposed toward the outside of the power distribution component 30. In this embodiment, the outer side surface 334 and the body side surface 319 are located on a same plane, so that the outer side surface of the power distribution component 30 is kept flat, to facilitate insertion of the power distribution component 30 into the box body 11 of the power distribution box 10. A chamfer 337 is formed between the first surface 332 and the abutting surface 331. Outer side surfaces 334 of two adjacent power distribution units 301 attach to each other.

In this embodiment, the first surface 332 and an inner side surface, close to the second power insertion slot 325, of the signal insertion slot 324 are located on a same plane. The first surface 332 is configured to attach to the signal busbar 14 when the signal busbar 14 is inserted into the signal insertion slot 324, so that stability of contact between the signal terminal 314 and the signal busbar 14 can be improved. The first surface 332 can further guide the signal busbar 14 during insertion into the signal insertion slot 324, thereby improving smoothness of movement of the signal busbar 14 relative to the mistake proofing structure 33.

In this embodiment, the second surface 333 and an inner side surface, close to a side of the signal insertion slot 324, of the second power insertion slot 325 are located on a same plane. The second surface 333 is configured to attach to the second power busbar 15 when the second power busbar 15 is inserted into the second power insertion slot 325, so that stability of contact between the second power terminal 315 and the second power busbar 15 can be improved. The second surface 333 is further configured to guide insertion of the second power busbar 15 into the second power insertion slot 325, thereby improving smoothness of movement of the second power busbar 15 relative to the mistake proofing structure 33.

Refer to FIG. 1 and FIG. 4 again. When the first power terminal 313 of the power distribution component 30 is in contact with the first power busbar 13, and the second power terminal 315 is in contact with the second power busbar 15, it means that the power distribution component 30 is inserted into the power distribution box 10 in a correct insertion manner (which is forward insertion). The second power terminal 315 is disposed close to the bottom wall 111.

Figure 5:
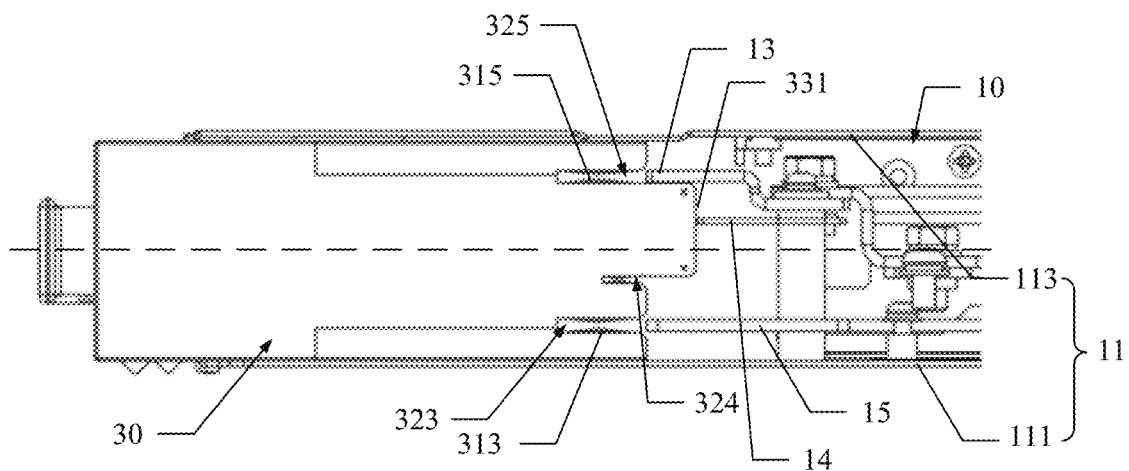
FIG. 5 is a schematic diagram of a state in which a power distribution component is reversely inserted into a power distribution box.
Figure 6:
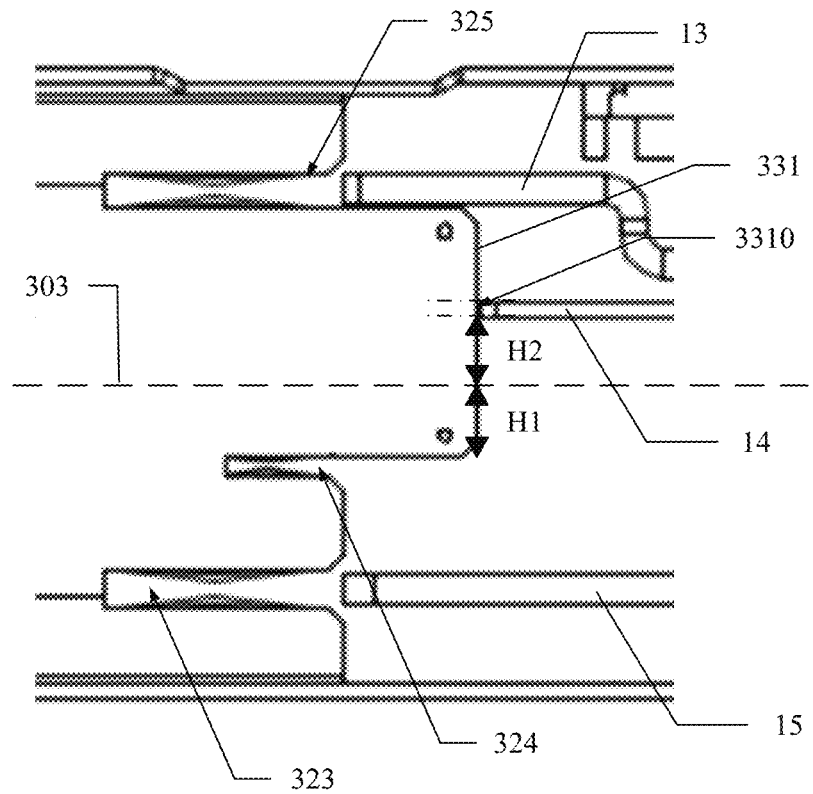
FIG. 6 is a schematic diagram of a partially enlarged area in FIG. 5.

Refer to FIG. 5 and FIG. 6. FIG. 5 is a schematic diagram of a state in which the power distribution component 30 is reversely inserted into the power distribution box 10. FIG. 6 is a schematic diagram of a partially enlarged area in FIG. 5. When the power distribution component 30 is reversely inserted into the power distribution box 10, the power distribution component 30 is inserted into the power distribution box 10 after being rotated by 180 degrees around the axial direction of the power distribution component 30, the first power insertion slot 323 and the first power terminal 313 are disposed close to the bottom wall 111, and the second power insertion slot 325 and the second power terminal 325 are disposed close to the top wall 113. The signal busbar 14 is in contact with the effective abutting surface 3310.

The abutting surface 331 of the mistake proofing structure 33 abuts against the signal busbar 14, to prevent the first power busbar 13 from being further inserted into the second power insertion slot 325 and from being in contact with the second power terminal 315, and to prevent the second power busbar 15 from being further inserted into the first power insertion slot 323 and from being in contact with the first power terminal 313. Therefore, a risk of short-circuit overheating caused by reverse insertion of the power distribution component 30 into the power distribution box 10 is reduced, thereby improving safety and reliability of the power distribution component 30 and the power distribution device 100.

The power distribution unit 301 further includes a latch 35 projecting from the body top surface 317, and the latch 35 is configured to connect to the top wall 113 of the box body 10 in a locking manner.

It can be understood that the first power insertion slot 323, the signal insertion slot 324, and the second power insertion slot 325 may be omitted. For example, in one embodiment, the main body 31 includes a support portion and an insertion portion having different widths along the second direction, and a width of the insertion portion is smaller than that of the support portion. The first power terminal 313 is disposed on a top surface of the insertion portion, and the second power terminal 315 is disposed on a bottom surface of the insertion portion. The signal terminal 314 is disposed on an end surface, facing away from the support portion, of the insertion portion.

It can be understood that there is no limitation in this application regarding the outer side surface 334 and the body side surface 319 being located on a same plane. The outer side surface 334 and the body side surface 319 may be located on different planes. For example, the outer side surface 334 and the body side surface 319 are flat surfaces, and the outer side surface 334 is connected at a specific angle to the body side surface 319. The outer side surface 334 may alternatively be a non-flat surface, for example, the outer side surface 334 may be a stepped surface, an arc surface, another curved surface, or the like.

Figure 7:
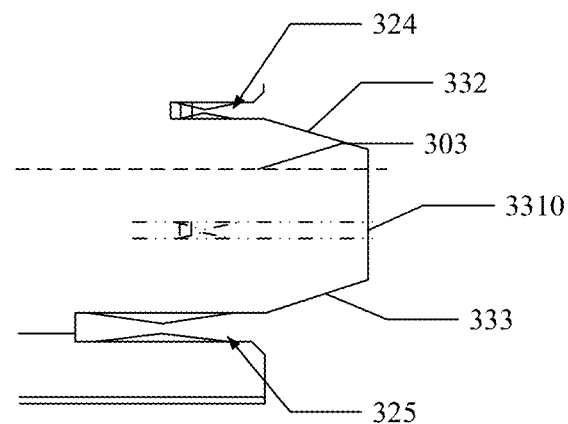
FIG. 7 and FIG. 8 are schematic diagrams of possible structures of a mistake proofing structure of a power distribution component according to this application.
Figure 8:
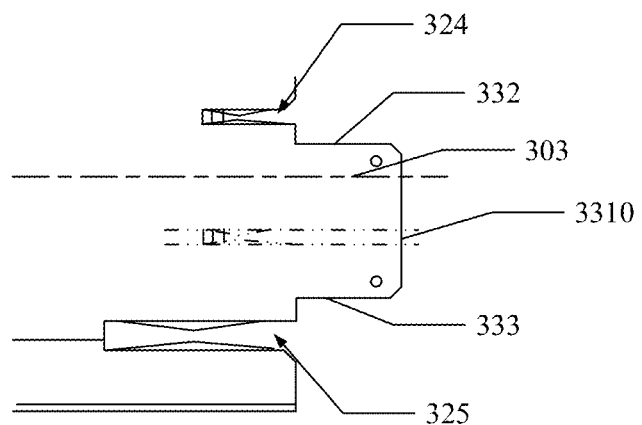

It can be understood that there is no limitation in this application regarding the first surface 332 and the inner side surface, close to the second power insertion slot 325, of the signal insertion slot 324 being located on a same plane. For example, the first surface 332 and the inner side surface, close to the second power insertion slot 325, of the signal insertion slot 324 are both flat surfaces. As shown in FIG. 7, the first surface 332 is connected at an angle to the inner side surface, close to the second power insertion slot 325, of the signal insertion slot 324. The first surface 332 may not be a flat surface, for example, the first surface 332 may be a stepped surface (as shown in FIG. 8), an arc surface, another curved surface, or the like.

It can be understood that there is no limitation in this application regarding the second surface 333 and the inner side surface, close to the side of the signal insertion slot 324, of the second power insertion slot 325 being located on a same plane. For example, the second surface 333 and the inner side surface, close to the side of the signal insertion slot 324, of the second power insertion slot 325 are both flat surfaces. As shown in FIG. 7, the second surface 333 is connected at a specific angle to an inner side surface, close to the side of the signal insertion slot 324, of the second power insertion slot 325. The second surface 333 may not be a flat surface, for example, the second surface 333 (as shown in FIG. 8) may be a stepped surface, an arc surface, another curved surface, or the like.

Figure 9:
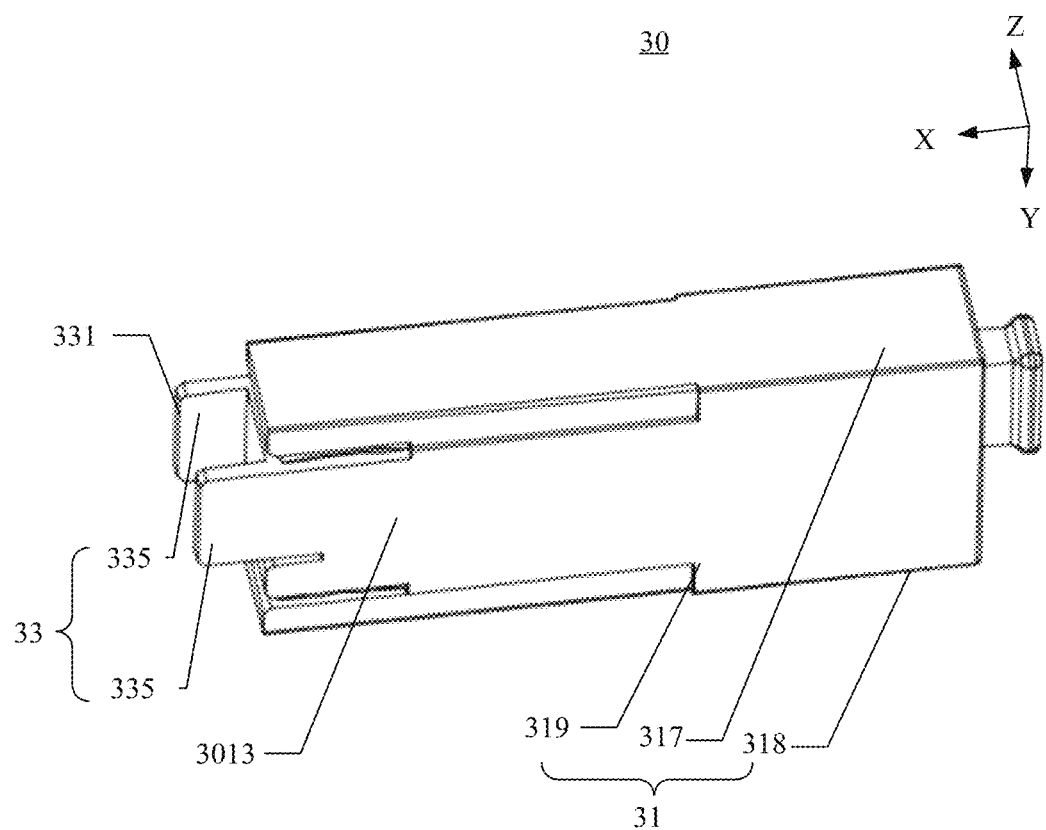
FIG. 9 is a schematic three-dimensional diagram of a power distribution component according to a second embodiment of this application.

Refer to FIG. 9. A difference between a power distribution component 30 provided in a second embodiment of this application and the power distribution component provided in the first embodiment lies in that each mistake proofing structure 33 includes two mistake proofing plates 335, and the two mistake proofing plates 335 are disposed on an end surface of a second end 3013 of a main body 31 at an interval. An abutting surface 331 is located on a surface, facing away from the main body 31, of the mistake proofing plate 335. Because the two mistake proofing plates 335 are disposed on the end surface of the second end 3013 of the main body 31 at an interval, a symmetric dovetail mistake proofing structure is formed. The mistake proofing structure 33 includes the two mistake proofing plates 335 disposed at an interval, which helps reduce material for manufacturing the power distribution component 30 and reduces costs.

Specifically, the main body 31 further includes a body top surface 317, a body bottom surface 318, and a body side surface 319. The body top surface 317 and the body bottom surface 318 are disposed opposite to each other. The body side surface 319 is connected between the body top surface 317 and the body bottom surface 318. The main body 31 extends in a second direction different from a first direction, and the two mistake proofing plates 335 are disposed on the end surface of the second end of the main body 31 at an interval along a third direction. The third direction is different from the first direction, and the third direction is different from the second direction. An outer side surface 337, disposed facing the outside of a power distribution unit 301, of the mistake proofing plate 335 and the body side surface 319 are located on a same plane, to facilitate insertion of the power distribution unit 301 into the power distribution box (not shown in the figure).

It can be understood that a quantity of mistake proofing plates 335 is not limited in this application, and the quantity of mistake proofing plates 335 may be at least two, as long as the at least two mistake proofing plates 335 are disposed on the end surface of the second end 3013 of the main body 31 at an interval.

Figure 10:
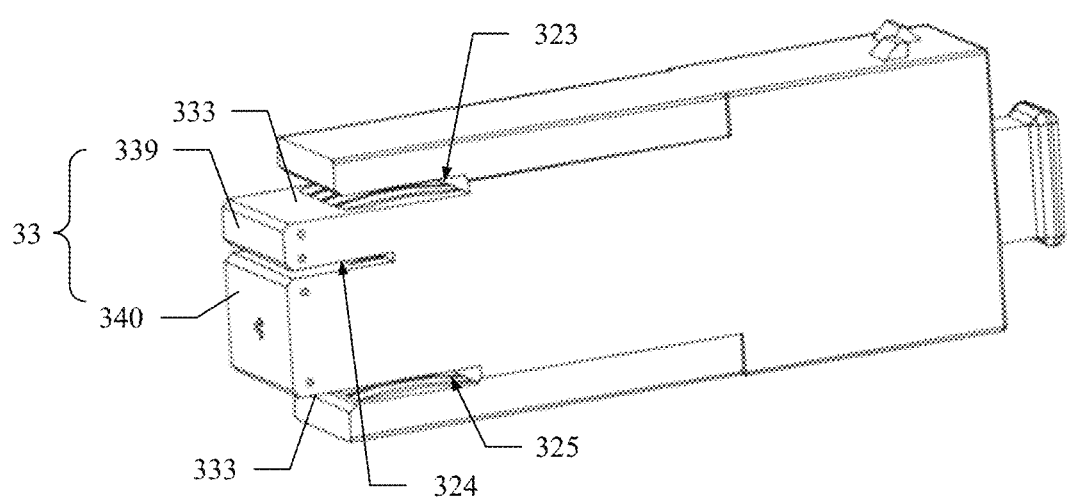
FIG. 10 is a schematic three-dimensional diagram of a power distribution component according to a third embodiment of this application.

Refer to FIG. 10. A difference between a power distribution component 30 provided in a third embodiment of this application and the power distribution component provided in the first embodiment lies in that a mistake proofing structure 33 is also disposed between a first power insertion slot 323 and a signal insertion slot 324. In other words, there are two mistake proofing structures 33, that is, each power distribution unit 301 is a double-boss structure. The double-boss mistake proofing structure 33 includes a first mistake proofing structure 339 and a second mistake proofing structure 340.

The first mistake proofing structure 339 is disposed between the first power insertion slot 323 and the signal insertion slot 324. A second surface 333 of the first mistake proofing structure 339 and an inner side surface, close to a side of the signal insertion slot 324, of the first power insertion slot 323 are located on a same plane. The second surface 333 of the first mistake proofing structure 339 is configured to attach to a first power busbar when the first power busbar is inserted into the first power insertion slot 323, to improve stability of contact between a first power terminal 313 and the first power busbar. The second surface 333 of the first mistake proofing structure 339 is further configured to guide insertion of the first power busbar into the first power insertion slot 324, thereby improving smoothness of movement of the first power busbar 13 relative to the mistake proofing structure 33.

It can be understood that there is no limitation regarding the second surface 333 of the first mistake proofing structure 339 and the inner side surface, close to the side of the signal insertion slot 324, of the first power insertion slot 323 being located on a same plane. For example, the second surface 333 of the first mistake proofing structure 339 and the inner side surface, close to the side of the signal insertion slot 324, of the first power insertion slot 323 are both flat surfaces. The second surface 333 of the first mistake proofing structure 339 is connected at a specific angle to the inner side surface, close to the side of the signal insertion slot 324, of the first power insertion slot 323. The second surface 333 of the first mistake proofing structure 339 may not be a flat surface, for example, the second surface 333 of the first mistake proofing structure 339 may be a stepped surface, an arc surface, another curved surface, or the like.

The second mistake proofing structure 340 is disposed between a second power insertion slot 325 and the signal insertion slot 324. A second surface 333 of the second mistake proofing structure 340 and an inner side surface, close to a side of the signal insertion slot 324, of the second power insertion slot 325 are located on a same plane. The second surface 333 of the second mistake proofing structure 340 is configured to attach to a second power busbar when the second power busbar is inserted into the second power insertion slot 325, to improve stability of contact between the first power terminal 313 and the first power busbar. The second surface 333 of the second mistake proofing structure 340 is further configured to guide insertion of the second power busbar into the second power insertion slot 325, thereby improving smoothness of movement of the second power busbar 15 relative to the mistake proofing structure 33.

It can be understood that there is no limitation regarding the second surface 333 of the second mistake proofing structure 340 and the inner side surface, close to the side of the signal insertion slot 324, of the second power insertion slot 325 being located on a same plane. For example, the second surface 333 of the second mistake proofing structure 340 and the inner side surface, close to the side of the signal insertion slot 324, of the second power insertion slot 325 are both flat surfaces. The second surface 333 of the second mistake proofing structure 340 is connected at a specific angle to the inner side surface, close to the side of the signal insertion slot 324, of the second power insertion slot 325. The second surface 333 of the second mistake proofing structure 340 may not be a flat surface, for example, the second surface 333 of the second mistake proofing structure 340 may be a stepped surface, an arc surface, another curved surface, or the like.

It should be understood that expressions such as "include" and "may include" that may be used in this application indicate existence of the disclosed function, operation, or constituent element, and do not limit one or more additional functions, operations, and constituent elements. In this application, terms such as "include" and/or "have" may be construed as a particular characteristic, quantity, operation, constituent element, or component, or a combination thereof, but cannot be construed as excluding the existence or possible addition of one or more other characteristics, quantities, operations, constituent elements, or components, or combinations thereof.

In addition, in this application, the expression "and/or" includes any and all combinations of words listed in association. For example, the expression "A and/or B" may include A, may include B, or may include both A and B.

In this application, expressions including ordinal numbers such as "first" and "second" may modify elements. However, such elements are not limited by the expressions. For example, the expressions do not limit the order and/or importance of the elements. The expression is used only to distinguish one element from another. For example, first user equipment and second user equipment indicate different user equipment, although both the first user equipment and the second user equipment are user equipment. Similarly, without departing from the scope of this application, a first element may be referred to as a second element, and similarly, a second element may also be referred to as a first element.

When a component "connects" or "is connected" to another component, it should be understood that the component directly connects or is directly connected to the other component, or a further component may alternatively exist between the component and the other component. In addition, when a component "directly connects" or "directly connected" to another component, it should be understood that there is no component between them.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power distribution component, configured to pluggably connect to a power distribution box, wherein the power distribution component comprises:
a main body comprising a first end and a second end that are disposed opposite to each other, the second end provided with a first power terminal, a signal terminal, and a second power terminal that are sequentially arranged along a first direction, wherein the first power terminal is configured to electrically connect to a first power busbar of the power distribution box, the signal terminal is configured to electrically connect to a signal busbar of the power distribution box, the second power terminal is configured to electrically connect to a second power busbar of the power distribution box, and polarities of the first power terminal and the second power terminal are opposite; and
a mistake proofing structure protruding from the second end, the mistake proofing structure comprising an abutting surface facing away from the main body and located at an end of the mistake proofing structure, wherein the abutting surface is configured to abut against the signal busbar when the power distribution component is incorrectly inserted into the power distribution box;
wherein an end surface of the second end of the main body is provided with a first power insertion slot, a signal insertion slot, and a second power insertion slot that are sequentially arranged along the first direction, the first power terminal is disposed on an inner side surface of the first power insertion slot, the signal terminal is disposed on an inner side surface of the signal insertion slot, the second power terminal is disposed on an inner side surface of the second power insertion slot, the first power insertion slot is configured to engage with the first power busbar, the signal insertion slot is configured to engage with the signal busbar, and the second power insertion slot is configured to engage with the second power busbar;
wherein the mistake proofing structure is disposed between the first power insertion slot and the signal insertion slot, and/or the mistake proofing structure is disposed between the signal insertion slot and the second power insertion slot; and
wherein the main body further comprises a body top surface and a body bottom surface that are disposed in parallel and opposite to each other, the power distribution component having a central plane that is perpendicular to the first direction, wherein a vertical distance between the central plane and the body top surface is the same as a vertical distance between the central plane and the body bottom surface, a position of the first power insertion slot and a position of the second power insertion slot are symmetrically disposed about the central plane, the abutting surface comprises an effective abutting surface configured to come into contact with the signal busbar when the power distribution component is incorrectly inserted into the power distribution box, a distance between the effective abutting surface and the central plane is a first distance, a distance between an inner side surface, close to the mistake proofing structure, of the signal insertion slot and the central plane is a second distance, and the first distance is the same as the second distance.

2. The power distribution component according to claim 1, wherein an extension length of the first power insertion slot along a second direction is a first length, an extension length of the signal insertion slot along the second direction is a second length, an extension length of the mistake proofing structure along the second direction is a third length, the third length is greater than or equal to a difference between the first length and the second length, and the second direction is perpendicular to the first direction.

3. The power distribution component according to claim 1, wherein the mistake proofing structure further comprises a first surface and a second surface, the abutting surface is connected between the first surface and the second surface, the first surface is provided on a side, close to the signal insertion slot, of the mistake proofing structure, and the second surface is provided on a side, facing away from the signal insertion slot, of the mistake proofing structure.

4. The power distribution component according to claim 3, wherein the first surface and an inner side surface, close to a side of the mistake proofing structure, of the signal insertion slot are located on a same plane, and the first surface is configured to attach to the signal busbar when the signal busbar is inserted into the signal insertion slot.

5. The power distribution component according to claim 3, wherein the mistake proofing structure disposed between the first power insertion slot and the signal insertion slot is a first mistake proofing structure, a second surface of the first mistake proofing structure and an inner side surface, close to a side of the signal insertion slot, of the first power insertion slot are coplanar, and the second surface of the first mistake proofing structure is configured to attach to the first power busbar when the first power busbar is inserted into the first power insertion slot.

6. The power distribution component according to claim 3, wherein the mistake proofing structure disposed between the second power insertion slot and the signal insertion slot is a second mistake proofing structure, a second surface of the second mistake proofing structure and an inner side surface, close to the signal insertion slot, of the second power insertion slot are coplanar, and the second surface of the second mistake proofing structure is configured to attach to the second power busbar when the second power busbar is inserted into the second power insertion slot.

7. The power distribution component according to claim 3, wherein the main body further comprises a body side surface, the body the body side surface is connected between the body top surface and the body bottom surface, the main body extends in a second direction different from the first direction, the mistake proofing structure further comprises an outer side surface connecting the first surface and the second surface, the outer side surface is disposed toward the outside of the power distribution component, and the outer side surface and the body side surface are located on a same plane.

8. The power distribution component according to claim 1, wherein the mistake proofing structure comprises at least two mistake proofing plates disposed on an end surface of the second end of the main body and spaced apart by an interval, and the abutting surface is located on a surface, facing away from the main body, of each mistake proofing plate.

9. The power distribution component according to claim 8, wherein the main body extends in a second direction different from the first direction, the at least two mistake proofing plates are arranged on an end surface of the second end of the main body along a third direction at an interval, the third direction is different from the first direction and different from the second direction.

10. A power distribution device comprising:
a power distribution component plugged into a power distribution box, wherein the power distribution box comprises a box body, a first power busbar, a second power busbar, and a signal busbar, wherein the first power busbar, the signal busbar, and the second power busbar are sequentially arranged in the box body along a first direction;
wherein the power distribution component comprises a main body comprising a first end and a second end that are disposed opposite to each other, the second end provided with a first power terminal, a signal terminal, and a second power terminal that are sequentially arranged along a first direction, the first power terminal is electrically connected to the first power busbar, the signal terminal is electrically connected to the signal busbar, the second power terminal is electrically connected to the second power busbar, and polarities of the first power terminal and the second power terminal are opposite; and
the power distribution component further comprises a mistake proofing structure protruding at the second end, the mistake proofing structure comprising an abutting surface facing away from the main body and located at an end of the mistake proofing structure, and the abutting surface is configured to abut against the signal busbar when the power distribution component is incorrectly inserted into the power distribution box;
wherein an end surface of the second end of the main body is provided with a first power insertion slot, a signal insertion slot, and a second power insertion slot that are sequentially arranged along the first direction, the first power terminal is disposed on an inner side surface of the first power insertion slot, the signal terminal is disposed on an inner side surface of the signal insertion slot, the second power terminal is disposed on an inner side surface of the second power insertion slot, the first power insertion slot is configured to engage with the first power busbar, the signal insertion slot is configured to engage with the signal busbar, and the second power insertion slot is configured to engage with the second power busbar;
wherein the mistake proofing structure is disposed between the first power insertion slot and the signal insertion slot, and/or the mistake proofing structure is disposed between the signal insertion slot and the second power insertion slot; and
wherein the main body further comprises a body top surface and a body bottom surface that are disposed in parallel and opposite to each other, the power distribution component having a central plane, the central plane being perpendicular to the first direction, wherein a vertical distance between the central plane and the body top surface is the same as a vertical distance between the central plane and the body bottom surface, a position of the first power insertion slot and a position of the second power insertion slot are disposed symmetric about the central plane, the abutting surface comprises an effective abutting surface configured to come into contact with the signal busbar when the power distribution component is incorrectly inserted into the power distribution box, a distance between the effective abutting surface and the central plane is a first distance, a distance between an inner side surface, close to the mistake proofing structure, of the signal insertion slot and the central plane is a second distance, and the first distance is the same as the second distance.

11. The power distribution device according to claim 10, wherein an extension length of the first power insertion slot along a second direction is a first length, an extension length of the signal insertion slot along the second direction is a second length, an extension length of the mistake proofing structure along the second direction is a third length, the third length is greater than or equal to a difference between the first length and the second length, and the second direction is perpendicular to the first direction.

12. The power distribution device according to claim 10, wherein the mistake proofing structure further comprises a first surface and a second surface, the abutting surface is connected between the first surface and the second surface, the first surface is provided on a side, close to the signal insertion slot, of the mistake proofing structure, and the second surface is provided on a side, facing away from the signal insertion slot, of the mistake proofing structure.

13. The power distribution device according to claim 12, wherein the first surface and an inner side surface, close to a side of the mistake proofing structure, of the signal insertion slot are located on a same plane, and the first surface is configured to attach to the signal busbar when the signal busbar is inserted into the signal insertion slot.

14. The power distribution device according to claim 12, wherein the mistake proofing structure disposed between the first power insertion slot and the signal insertion slot is a first mistake proofing structure, a second surface of the first mistake proofing structure and an inner side surface, close to a side of the signal insertion slot, of the first power insertion slot are coplanar, and the second surface of the first mistake proofing structure is configured to attach to the first power busbar when the first power busbar is inserted into the first power insertion slot.

15. The power distribution device according to claim 12, wherein the mistake proofing structure disposed between the second power insertion slot and the signal insertion slot is a second mistake proofing structure, a second surface of the second mistake proofing structure and an inner side surface, close to the signal insertion slot, of the second power insertion slot are coplanar, and the second surface of the second mistake proofing structure is configured to attach to the second power busbar when the second power busbar is inserted into the second power insertion slot.

16. The power distribution device according to claim 12, wherein the main body further comprises a body side surface, the body side surface is connected between the body top surface and the body bottom surface, the main body extends in a second direction different from the first direction, the mistake proofing structure further comprises an outer side surface connecting the first surface and the second surface, the outer side surface is disposed toward the outside of the power distribution component, and the outer side surface and the body side surface are located on a same plane.

17. The power distribution device according to claim 10, wherein the mistake proofing structure comprises at least two mistake proofing plates disposed on an end surface of the second end of the main body and spaced apart by an interval, and the abutting surface is located on a surface, facing away from the main body, of each mistake proofing plate.

18. The power distribution device according to claim 17, wherein the main body extends in a second direction different from the first direction, the at least two mistake proofing plates are arranged on an end surface of the second end of the main body along a third direction at an interval, the third direction is different from the first direction and different from the second direction.

* * * * *

UNITED STATES PATENT AND TRADEMARK OFFICE
CERTIFICATE OF CORRECTION

PATENT NO. : 12,176,655 B2
APPLICATION NO. : 17/683767
DATED : December 24, 2024
INVENTOR(S) : Kai Yin et al.

Page 1 of 1

It is certified that error appears in the above-identified patent and that said Letters Patent is hereby corrected as shown below:

In the Claims

In Column 15, Claim 7, Line 47, delete "the body the body side" and insert -- the body side --.

Signed and Sealed this
Fourth Day of February, 2025

Coke Morgan Stewart
*Acting Director of the United States Patent and Trademark Office*